(12) United States Patent
Chen et al.

(10) Patent No.: US 8,450,409 B2
(45) Date of Patent: May 28, 2013

(54) METHOD FOR MIXING A RUBBER COMPOSITION

(75) Inventors: Zhong-Ren Chen, Stow, OH (US); Joseph M. Lanzarotta, Uniontown, OH (US); Yuichi Nagai, Tokyo (JP); Tomohiro Kusano, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 133 days.

(21) Appl. No.: 12/870,237

(22) Filed: Aug. 27, 2010

(65) Prior Publication Data
US 2012/0053262 A1 Mar. 1, 2012

Related U.S. Application Data

(60) Provisional application No. 61/237,899, filed on Aug. 28, 2009.

(51) Int. Cl.
*B60C 1/00* (2006.01)
*C08K 3/04* (2006.01)

(52) U.S. Cl.
USPC ............................ 524/495; 524/100; 525/420

(58) Field of Classification Search
USPC .................................. 524/100, 495; 525/420
See application file for complete search history.

(56) References Cited

U.S. PATENT DOCUMENTS

| | | | |
|---|---|---|---|
| 4,261,403 A | 4/1981 | Imai et al. | |
| 5,151,142 A | 9/1992 | Imai et al. | |
| 5,334,665 A | 8/1994 | Lawson et al. | |
| 5,430,095 A | 7/1995 | Ishiura et al. | |
| 6,070,634 A | 6/2000 | Sandstrom et al. | |
| 6,426,378 B1 | 7/2002 | Lickes et al. | |
| 6,512,051 B2 | 1/2003 | Chino et al. | |
| 6,834,697 B2 | 12/2004 | Sandstrom | |
| 7,141,622 B2 | 11/2006 | Bowen, III et al. | |
| 7,625,970 B2 | 12/2009 | Klinkenberg et al. | |
| 8,158,700 B2 | 4/2012 | Chen | |
| 2006/0167160 A1 | 7/2006 | Nakagawa et al. | |
| 2006/0167163 A1 | 7/2006 | Ohashi et al. | |
| 2007/0149689 A1 | 6/2007 | Wang et al. | |
| 2008/0110544 A1 | 5/2008 | Nakamura | |
| 2011/0054069 A1 | 3/2011 | Chen | |

FOREIGN PATENT DOCUMENTS

| | | |
|---|---|---|
| JP | 6183242 | 7/1994 |
| JP | 2006083301 | 3/2006 |

OTHER PUBLICATIONS

RU 2286363 , Bychkov S P et al. , Rubber mixture for manufacture of shock-absorbing layers for rail fasteners to be secured under rails and on sleepers Oct. 27, 2006.*
Office Action, U.S. Appl. No. 12/870,260 (Jun. 7, 2012).

* cited by examiner

*Primary Examiner* — Terressa Boykin
(74) *Attorney, Agent, or Firm* — Meredith E. Hooker; Nathan T. Lewis

(57) ABSTRACT

Disclosed is a method comprising: (a) mixing in a first mixing step ingredients comprising (i) first polymer, (ii) a low molecular weight polymer having a number average molecular weight of about 5,000 to about 100,000, and (iii) a filler, and (b) mixing in a second mixing step ingredients comprising (i) the mixture obtained in step (a), (ii) a second polymer that is different from said first polymer, and (iii) optionally a filler. In one embodiment, the method further comprises mixing sulfur and vulcanization accelerator(s) into the composition, forming the rubber composition into a sidewall for a tire, and vulcanizing the rubber composition.

21 Claims, No Drawings

METHOD FOR MIXING A RUBBER COMPOSITION

This application claims the benefit of U.S. Provisional Application No. 61/237,899, filed Aug. 28, 2009, which is incorporated herein by reference in its entirety.

FIELD OF THE DISCLOSURE

This disclosure generally relates to a method for mixing rubber compositions. The rubber composition comprises at least one low molecular weight polymer.

BACKGROUND

Most rubber compositions, especially rubber compositions suitable for tires, contain multiple polymers and may also contain multiple fillers. However, different types of fillers have different affinities towards different types of polymers. For example, in a rubber composition containing polybutadiene and natural rubber, carbon black is likely to be more concentrated in the polybutadiene phase since carbon black has a higher affinity towards polybutadiene versus natural rubber. This type of filler distribution may impact crack growth resistance in rubber compositions such as tire sidewalls or air springs, as well as rolling resistance and/or wear resistance of rubber compositions such as tire treads. Moreover, the domain size of the different types of polymers may impact the crack growth resistance, rolling resistance and/or wear resistance of the rubber composition. Mixing the different polymers for a longer period of time may not offer desirable filler distribution or a reduced domain size of the different polymers. Moreover, adding mix time is inefficient in regard to processing costs.

Thus, what is needed is a rubber composition that has a more even distribution of filler among the different polymers, and/or smaller domain sizes of the different types of polymers.

SUMMARY

Disclosed is a method comprising:
a. mixing in a first mixing step ingredients comprising:
i. a first polymer,
ii. a low molecular weight polymer having a number average molecular weight of about 5,000 to about 100,000, and
iii. a filler,
b. mixing in a second mixing step ingredients comprising:
i. the mixture obtained in step (a),
ii. a second polymer that is different from said first polymer, and
iii. optionally a filler.

Also disclosed is a method comprising:
a. mixing in a first mixing step ingredients comprising:
i. a first polymer comprising isoprene mer units,
ii. a low molecular weight polymer comprising isoprene mer units, wherein said low molecular weight polymer has a number average molecular weight of about 5,000 to about 100,000, and
iii. a filler,
b. mixing in a second mixing step ingredients comprising:
i. the mixture obtained in step (a),
ii. a second polymer that is different from said first polymer, and
iii. optionally a filler.

Further disclosed is a method of forming a sidewall for a tire, comprising the steps of:
a. mixing in a first mixing step ingredients comprising:
i. a first polymer,
ii. a low molecular weight polymer having a number average molecular weight of about 5,000 to about 100,000, and
iii. a filler,
b. mixing in a second mixing step ingredients comprising:
i. the mixture obtained in step (a),
ii. a second polymer that is different from said first polymer, and
iii. optionally a filler,
c. mixing in a third mixing step ingredients comprising:
i. the mixture obtained in step (b),
ii. a vulcanizing agent, and
iii. one or more vulcanization accelerator,
d. forming the mixture obtained in step (c) into a sidewall for a tire, and
e. vulcanizing the mixture obtained in step (d).

Other aspects of the present disclosure will be apparent to the ordinarily skilled artisan from the description that follows. To assist in understanding the description of various embodiments that follow, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH2CH2-);

"copolymer" means a polymer that includes mer units derived from two reactants, typically monomers, and is inclusive of random, block, segmented, graft, gradient, etc., copolymers; and "phr" means parts by weight of a referenced material per 100 parts by weight rubber, and is a recognized term by those having skill in the rubber compounding art.

All references incorporated herein by reference are incorporated in their entirety unless otherwise stated.

All number average molecular weights reported herein are calculated by using gel permeation chromatography (GPC) calibrated with polystyrene standards.

DETAILED DESCRIPTION

A method according to the disclosure comprises:
a. mixing in a first mixing step ingredients comprising:
i. a first polymer,
ii. a low molecular weight polymer having a number average molecular weight of about 5,000 to about 100,000, and
iii. a filler,
b. mixing in a second mixing step ingredients comprising:
i. the mixture obtained in step (a),
ii. a second polymer that is different from said first polymer, and
iii. optionally a filler.

One of the ingredients in the first mixing step is a first polymer. The first polymer may be any polymer. Suitable polymers that may be used as the first polymer include, but are not limited to, polyisoprene (synthetic polyisoprene or natural rubber), styrene-butadiene rubber (SBR), styrene-isoprene rubber, styrene-isoprene-butadiene rubber, isoprene-butadiene rubber, polybutadiene (BR), acrylonitrile-butadiene rubber (NBR), silicone rubber, fluoroelastomers, ethylene acrylic rubber, nitrile rubber, hydrogenated nitrile rubber, ethylene propylene rubber (EPR), ethylene propylene diene monomer (EPDM) rubber, butyl rubber, polychloroprene, and mixtures thereof. In one embodiment, the first polymer comprises isoprene mer units. If the first polymer is one that contains isoprene mer units, it may be any polymer comprising isoprene mer units. Suitable polymers containing isoprene mer units may include, but are not limited to, those selected from the group consisting of polyisoprene (natural rubber or synthetic polyisoprene), isoprene-butadiene copolymer, isobutylene-isoprene copolymer, styrene-isoprene rubber, and mixtures thereof. In one embodiment, the first polymer is polyisoprene.

The first polymer may have a number average molecular weight of between about 100,000 to about 500,000, or between about 125,000 to about 400,000, or between about 150,000 to about 300,000.

The first polymer may be added to the rubber composition in an amount ranging from about 1 phr to about 99 phr, or from about 10 phr to about 80 phr, or from about 20 phr to about 60 phr, or from about 30 phr to about 50 phr.

Another ingredient in the first mixing step is a low molecular weight polymer having a number average molecular weight of about 5,000 to about 100,000. Alternatively, the number average molecular weight of the first low molecular weight polymer may be from about 10,000 to about 70,000, or from about 20,000 to about 60,000. Optionally, the first mixing step may comprise a combination of two or more low molecular weight polymers having a number average molecular weight of about 5,000 to about 100,000. The low molecular weight polymer may contain any type of mer unit, including, but not limited to, butadiene, isoprene, styrene, isobutylene, and mixtures thereof. In one embodiment, the low molecular weight polymer comprises isoprene mer units.

In one embodiment, the first polymer and the low molecular weight polymer both comprise isoprene mer units. In another embodiment the first polymer comprises isoprene mer units, and the low molecular weight polymer may be a block copolymer comprising a block A and a block B, where block A comprises isoprene mer units and block B comprises a majority of the same type of mer units that make up a majority of the second polymer of the rubber composition. Block A may comprise any amount of isoprene mer units. In one embodiment, Block A comprises a majority of isoprene mer units. In another embodiment, Block A comprises from about 70 to about 100 mol % of isoprene mer units. In yet another embodiment, Block A comprises from about 95 to about 100 mol % of isoprene mer units.

If the second polymer in the rubber composition comprises more than one type of mer unit, Block B should comprise a majority of the same type of the mer unit that makes up the largest portion of the second polymer. For example, if the second polymer in the rubber composition is a styrene-butadiene rubber having 23.5 mol % styrene and 76.5 mol % butadiene, Block B should comprise a majority of butadiene since butadiene makes up the majority of the second polymer.

If the low molecular weight polymer comprises a block A and a block B, block A may make up from about 1 to about 99 mol % of the low molecular weight polymer, or less than about 50 mol %, or less than about 25 mol %.

In another embodiment, the low molecular weight polymer may contain one or more functional groups. The functional group(s) may be any functional group that interacts with the filler(s) in the rubber composition. Suitable functional groups include, but are not limited to, those selected from the group consisting of hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups, and mixtures thereof. In one embodiment, the functional group(s) is carboxyl.

Optionally, if the low molecular weight polymer contains carbonyl groups, such as, for example, from the presence of succinic anhydride, a protic material such as water, methanol, or ethanol, may be added during the first mixing step to produce carboxyl group(s) on the low molecular weight polymer. This, however, is optional, as it may be desirable for the low molecular weight polymer to contain carbonyl groups.

Exemplary commercially available polymers suitable as the low molecular weight polymer include, but are not limited to, LIR-310, LIR-390, LIR-403, and LIR-410, all of which are available from Kuraray Co.

The low molecular weight polymer(s) may added in any amount, but preferably is added in an amount of about 1 phr to about 30 phr, or from about 1 phr to about 20 phr, or from about 1 phr to about 10 phr.

Yet another ingredient in the first mixing step is a filler. The filler may be selected from the group consisting of carbon black, silica, and mixtures thereof. The total amount of filler added in the first mixing step may be from about 1 to about 200 phr, or alternatively from about 5 to about 100 phr, or from about 10 phr to about 30 phr, or from about 30 to about 80 phr, or from about 40 to about 70 phr.

Carbon black may be present in an amount of about 1 to about 200 phr, or alternatively in an amount of about 5 to about 100 phr, or alternatively in an amount of about 30 to about 80 phr. Suitable carbon blacks include commonly available, commercially-produced carbon blacks, but those having a surface area of at least 20 $m^2/g$, or preferably, at least 35 $m^2/g$ up to 200 $m^2/g$ or higher are preferred. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or alternatively in an amount of about 5 to about 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP0), and J. M. Huber Corporation.

The surface of the carbon black and/or silica may also be treated or modified to improve the affinity to particular types of polymers. Such surface treatments and modifications are well known to those skilled in the art.

If silica is used as a filler, it may be desirable to use a coupling agent to couple the silica to the polymer. Numerous coupling agents are known, including but not limited to organosulfide polysulfides and organoalkoxymercaptosilanes. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'- bis(triethoxysilylpropyl)octasulfide, 3,3'-bis (trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis (methoxydiethoxysilylethyl)tetrasulfide, 2,2'-bis (tripropoxysilylethyl)pentasulfide, 3,3'-bitricycloneoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis (methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis (dimethylethylmercaptosilylpropyl)tetrasulfide, 2,2'-bis (methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bisarimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide and 3,3'-bis (dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoylthio-1-propyltriethoxysilane, available as NXT™ Silane from Momentive Performance Materials Inc.

Mixtures of various organosilane polysulfide compounds and organoalkoxymercaptosilanes can be used.

The amount of coupling agent in the composition is the amount needed to produce acceptable results, which is easily determined by one skilled in the art. The amount of coupling agent is typically based on the weight of the silica in the composition, and may be from about 0.1% to about 20% by weight of silica, or alternatively from about 1% to about 15% by weight of silica, or alternatively from about 1% to about 10% by weight of silica.

Additional fillers may also be utilized, including but not limited to, mineral fillers, such as clay, talc, aluminum hydrate, aluminum hydroxide and mica. The foregoing additional fillers are optional and can be utilized in varying amounts from about 0.5 phr to about 40 phr.

In a second mixing step, the mixture obtained in the first mixing step is mixed with ingredients comprising (1) a second polymer that is different from the first polymer used in the first mixing step, and (2) optionally a filler.

The second polymer that is different from the first polymer may be any polymer. By stating that the second polymer is different from the first polymer, it is meant that the second polymer contains at least one mer unit that is different from the mer unit(s) in the first polymer, and optionally additional mer units that are the same as those in the first polymer. For example, if the first polymer is polyisoprene, the second polymer may be isoprene-butadiene copolymer. Suitable polymers that may be used as the second polymer include, but are not limited to, styrene-butadiene rubber (SBR), styrene-isoprene rubber, styrene-isoprene-butadiene rubber, isoprene-butadiene rubber, polybutadiene (BR), acrylonitrile-butadiene rubber (NBR), silicone rubber, fluoroelastomers, ethylene acrylic rubber, nitrile rubber, hydrogenated nitrile rubber, ethylene propylene rubber (EPR), ethylene propylene diene monomer (EPDM) rubber, butyl rubber, polychloroprene, and mixtures thereof. In one embodiment, the second polymer is polybutadiene.

The second polymer comprising mer units that are different from the first polymer may have a number average molecular weight of between about 100,000 to about 500,000, or between about 125,000 to about 400,000, or between about 150,000 to about 300,000.

The second polymer may be added in an amount ranging from about 1 phr to about 99 phr, or from about 20 phr to about 80 phr, or from about 40 phr to about 80 phr, or from about 50 phr to about 70 phr.

A filler may optionally be included as an ingredient of the second mixing step. The filler may be any filler identified above, and may be the same as or different from the filler utilized in the first mixing step. If used in the second mixing step, the amount of filler added in the second mixing step is such that the total amount of filler in the rubber composition is between about 1 to about 200 phr, or alternatively from about 5 to about 100 phr, or alternatively from about 30 to about 80 phr, or from about 40 to about 70 phr.

In one embodiment, filler is added in the second mixing step, and the amount of filler added in the second mixing step versus the amount added in the first mixing step is proportional to the amount of second polymer versus the amount of first polymer based on a percentage of the total amount of such polymer. For example, if the amount of first polymer is 40 phr and the amount of second polymer is 60 phr, and the rubber composition contains 80 phr of filler, approximately 40% of the filler (approximately 32 phr) will be added in the first mixing step and approximately 60% of the filler (approximately 48 phr) will be added in the second mixing step. The purpose of this is to try to maintain equivalent filler concentration between the first and second polymers.

Other ingredients that may be added in the first and/or second mixing stages include, but are not limited to, oils, waxes, scorch inhibiting agents, tackifying resins, reinforcing resins, fatty acids such as stearic acid, and peptizers. These ingredients are known in the art, and may be added in appropriate amounts based on the desired physical and mechanical properties of the rubber composition. Also, other polymers, in addition to the first polymer and second polymer mentioned above, may be added to the composition such that the rubber composition contains at least three different polymers. The additional polymer(s) may be added in any mixing stage.

Optionally, the mixture obtained in the second mixing step is mixed with ingredients comprising (1) a vulcanizing agent, and (2) one or more vulcanization accelerators in a third mixing step.

Vulcanizing agents and vulcanization accelerators are known in the art, and may be added in appropriate amounts based on the desired physical, mechanical, and cure rate properties of the rubber composition. Examples of vulcanizing agents include sulfur and sulfur donating compounds. The amount of the vulcanizing agent used in the rubber composition may be from about 0.1 to about 10 phr, or from about 1 to about 5 parts by weight per 100 phr.

The vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio) benzothiazole (MBS), N-tert-butyl-2-benzothiazole sulfonamide (TBBS), N-cyclohexyl-2-benzothiazole sulfonamide (CBS), and mixtures thereof. The amount of vulcanization accelerator(s) used in the rubber composition may be from about 0.1 to about 10 phr, or from about 1 to about 5 phr.

The mixing steps of the disclosure may be accomplished by mixing the ingredients together by methods known in the art, such as, for example, by kneading the ingredients together in a Banbury mixer.

The first and second mixing steps may be conducted at a temperature of about 130° C. to about 200° C. The temperatures of the first and second mixing steps may be the same as or different from each other.

The third mixing step may be conducted at a temperature below the vulcanization temperature in order to avoid unwanted precure of the rubber composition. Therefore, the temperature of the third mixing step should not exceed about 120° C. and is typically about 40° C. to about 120° C., suitably about 60° C. to about 110° C. and, especially, about 75° C. to about 100° C.

The rubber composition formed from the mixing steps of the disclosure is particularly useful as a tire component or as an air spring component, although other rubber articles may also be formed. Exemplary tire components include, but are not limited to, tread and sidewall. There are many benefits of the disclosed rubber composition, including improved crack growth resistance.

To obtain a tire component, for example, a sidewall, the rubber composition produced in the second mixing step is subjected to a third mixing step to be combined with a vulcanizing agent and one or more vulcanization accelerators. The rubber composition is then formed into the sidewall, typically by extrusion. This is well known to persons skilled in the art. The rubber component is then vulcanized, typically by placing the tire containing the sidewall into a heated mold. This, again, is well known to persons skilled in the art.

The present disclosure will be described in more detail with reference to the following examples. The following examples are presented for purposes of illustration only and are not to be construed in a limiting sense.

EXAMPLES

Various rubber compositions were prepared and subjected to different types of tests.

Mooney viscosity of the rubber compositions was determined in accordance with ASTM D-1646 at 130° C.

To conduct durometer, tensile and crack growth testing, the rubber compositions were vulcanized for 15 minutes at 171° C. Tensile mechanical properties were measured by using the procedure described in ASTM-D 412 at 72° F. The tensile test specimens had dumbbell shapes with a thickness of 1.9 mm. A specific gauge length of 25.4 mm was used for the tensile test.

Crack growth testing was done using two methods: Demattia testing and Dc/Dn. Demattia testing was conducted according to ASTM D813, where the sample is pre-cut according to ASTM D430-b. The test measures the crack length. The Demattia testing is conducted at room temperature. Dc/Dn testing was done on a specimen having the specifications according to Die C of ASTM-D 412. The sample is pre-cut 0.5 mm in the center of the sample in the direction perpendicular to the strain. The initial gauge length of the specimen is 25 mm. Cyclic deformation is applied along the length direction with a strain amplitude of 60%. The frequency is 240 cycles per minute. The Dc/Dn testing was conducted at room temperature. The number of cycles necessary to cause the sample to break are recorded, with a higher number of cycles indicating a better crack growth resistance.

Fatigue to failure testing was done using a Monsanto Fatigue Tester (FTF-48-HT) manufactured by United Calibration Corp, according to the procedure specified in ASTM D4482. The test portion of the specimens has a dumbbell shape with a thickness of 1.5 mm, a width of 4.2 mm, and a length of 28 mm. The total length of the specimen is 79 mm. 12 dumbbell specimens are cut for each composition. These specimens are tested at room temperature with cam size of 24. The cycles to break for each specimen are recorded and an average is calculated as the flex cycles for the composition.

Examples 1-4

Four rubber compositions were prepared according to the formulations shown in Table 1. Table 1 also identifies the mixing step where each ingredient was added. The compositions were prepared by mixing the ingredients together in a Banbury mixer. All amounts shown are in phr, where the low molecular weight polymer is being treated as a rubber component. The compositions containing the low molecular weight polymer (Compositions 3 and 4) have a reduced oil amount in order to obtain approximately the same modulus as the control compositions (Compositions 1 and 2).

Table 1 also contains the properties of the compositions. It can bee seen that, unexpectedly, Composition 4, which was prepared according to the method of the disclosure, has improved crack resistance versus Compositions 1-3 as evidenced by the Demattia and Dc/Dn results. Without intending to be bound by theory, it is believed that the low molecular weight polymer has allowed the natural rubber and polybutadiene rubber to form smaller domain sizes, thereby improving crack resistance.

TABLE 1

|  | Composition 1 | Composition 2 | Composition 3 | Composition 4 |
|---|---|---|---|---|
| MasterBatch-1 |  |  |  |  |
| Low Molecular Weight Polymer[1] |  |  | 5.8 | 5.8 |
| Natural Rubber | 35 | 35 | 32.4 | 32.4 |

TABLE 1-continued

|  | Composition 1 | Composition 2 | Composition 3 | Composition 4 |
|---|---|---|---|---|
| Polybutadiene | 65 |  | 61.8 |  |
| Oil | 4 | 4 | 2 | 2 |
| Carbon Black | 50 | 20 | 50 | 20 |
| Antioxidants | 6.2 |  | 6.2 |  |
| Activators | 5.0 |  | 5.0 |  |
| Resins | 2 |  | 2 |  |
| MasterBatch-2 |  |  |  |  |
| Composition from MB-1 |  |  |  |  |
| Polybutadiene |  | 65 |  | 61.8 |
| Carbon Black |  | 30 |  | 30 |
| Antioxidants |  | 6.2 |  | 6.2 |
| Activators |  | 5.0 |  | 5.0 |
| Resins |  | 2 |  | 2 |
| Final Batch |  |  |  |  |
| Composition from MB-1 | 167.2 |  | 166.2 |  |
| Composition from MB-2 |  | 167.2 |  | 166.2 |
| Sulfur | 1.4 | 1.4 | 1.4 | 1.4 |
| Accelerators | 0.6 | 0.6 | 0.6 | 0.6 |
| TEST RESULTS |  |  |  |  |
| Mooney Viscosity | 40.5 | 39.6 | 35.0 | 35.0 |
| Demattia Crack (inches) | 0.11 | 0.05 | 0.00 | 0.00 |
| dc/dn cycles @ 60% Strain | 4.3E+05 | 5.9E+05 | 6.2E+05 | 1.1E+06 |
| Modulus @ 100% elongation, 72° F. (Mpa) | 1.4 | 1.4 | 1.4 | 1.4 |
| Modulus @ 300% elongation, 72° F. (Mpa) | 6.2 | 6.4 | 5.9 | 6.4 |
| Tensile at Break, 72° F. (Mpa) | 16.8 | 16.1 | 15.3 | 14.7 |
| Elongation at Break, 72° F. (Mpa) | 644 | 611 | 633 | 586 |

[1] Liquid isoprene-butadiene copolymer known as LIR-390 from Kuraray Co.

Examples 5-8

Four rubber compositions were prepared according to the formulations shown in Table 2. Table 2 also identifies the mixing step where each ingredient was added. The compositions were prepared by mixing the ingredients together in a Banbury mixer. All amounts shown are in phr, where the low molecular weight polymer is treated as a rubber component.

Table 2 also contains the properties of Compositions 5-8. It can bee seen that, unexpectedly, Compositions 6 and 8, which were prepared according to the method of the disclosure, have improved crack resistance versus Compositions 5 and 7 as evidenced by the Demattia and Dc/Dn results. Without intending to be bound by theory, it is believed that the low molecular weight polymer containing functional groups has allowed the natural rubber and polybutadiene to retain a more equal filler concentration, thereby improving crack resistance.

TABLE 2

|  | Composition 5 | Composition 6 | Composition 7 | Composition 8 |
|---|---|---|---|---|
| MasterBatch-1 |  |  |  |  |
| Low Molecular Weight Polymer[2] | 5.8 | 5.8 | 5.8 | 5.8 |
| Natural Rubber | 32.4 | 32.4 | 32.4 | 32.4 |
| Polybutadiene | 61.8 |  | 61.8 |  |
| Oil | 2 | 2 | 2 | 2 |
| Carbon Black | 50 | 20 | 50 | 20 |
| Antioxidants | 6.2 |  | 6.2 |  |
| Water | 2.0 | 2.0 | 1.0 | 1.0 |
| Activators | 5.0 |  | 5.0 |  |
| Resins | 2 |  | 2 |  |
| MasterBach-2 |  |  |  |  |
| Composition from MB-1 |  |  |  |  |
| Polybutadiene |  | 61.8 |  | 61.8 |
| Carbon Black |  | 30 |  | 30 |
| Antioxidants |  | 6.2 |  | 6.2 |
| Activators |  | 5.0 |  | 5.0 |
| Resins |  | 2 |  | 2 |
| Final Batch |  |  |  |  |
| Composition from MB-1 | 167.2 |  | 166.2 |  |
| Composition from MB-2 |  | 167.2 |  | 166.2 |
| Sulfur | 1.4 | 1.4 | 1.4 | 1.4 |
| Accelerators | 0.6 | 0.6 | 0.6 | 0.6 |
| TEST RESULTS |  |  |  |  |
| Mooney Viscosity | 37.9 | 37.6 | 37.9 | 38.5 |
| Demattia Crack (inches) | 0.02 | 0.01 | 0.02 | 0.01 |
| dc/dn cycles @ 60% Strain | 1.5E + 06 | 2.3E + 06 | 1.3E + 06 | 2.7E + 06 |
| Modulus @ 100% elongation, 72° F. (Mpa) | 1.5 | 1.4 | 1.5 | 1.4 |
| Modulus @ 300% elongation, 72° F. (Mpa) | 5.9 | 5.6 | 6.1 | 5.5 |

TABLE 2-continued

|  | Composition 5 | Composition 6 | Composition 7 | Composition 8 |
|---|---|---|---|---|
| Tensile at Break, 72° F. (Mpa) | 13.6 | 13.3 | 14.3 | 14.1 |
| Elongation at Break, 72° F. (Mpa) | 621 | 603 | 670 | 663 |

[2] Liquid functionalized polyisoprene known as LIR-403 from Kuraray Co., having the formula:

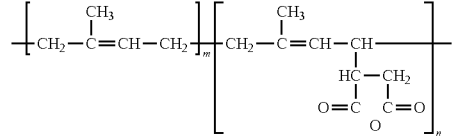

Examples 9-12

Four rubber compositions were prepared according to the formulations shown in Table 3. Table 3 also identifies the mixing step where each ingredient was added. The compositions were prepared by mixing the ingredients together in a Banbury mixer. All amounts shown are in phr, where the low molecular weight polymer is being treated as a rubber component. Compositions 11 and 12 have a reduced oil amount in order to obtain approximately the same modulus as the control composition (Composition 9).

Table 3 also contains the properties of Compositions 9-12. It can bee seen that, unexpectedly, Compositions 10-12, which were prepared according to the method of the disclosure, have improved crack resistance versus Composition 9 as evidenced by the Demattia and Dc/Dn results. Without intending to be bound by theory, it is believed that the low molecular weight polymer containing functional groups has allowed the natural rubber and polybutadiene to retain a more equal filler concentration, thereby improving crack resistance.

Table 3

|  | Composition 9 | Composition 10 | Composition 11 | Composition 12 |
|---|---|---|---|---|
| MasterBatch-1 |  |  |  |  |
| Low Molecular Weight Polymer[3] |  | 4 | 6 | 6 |
| Natural Rubber | 40 | 38 | 37.3 | 37.3 |
| Oil | 11 | 11 | 9 | 9 |
| Carbon Black | 30 | 30 | 29.4 | 29.4 |
| Resins | 4 | 4 | 4 | 4 |
| Water |  |  |  | 1 |
| MasterBach-2 |  |  |  |  |
| Composition from MB-1 | 85 | 87 | 85.7 | 86.7 |
| Polybutadiene | 60 | 58 | 56.7 | 56.7 |
| Carbon Black | 25 | 25 | 24.6 | 24.6 |
| Antioxidants | 4.0 | 4.0 | 4.0 | 4.0 |
| Activators | 4 | 4 | 4 | 4 |
| Final Batch |  |  |  |  |
| Composition from MB-2 | 178 | 178 | 175 | 176 |
| Antioxidants | 2.5 | 2.5 | 2.5 | 2.5 |
| Sulfur | 2.62 | 2.62 | 2.62 | 2.62 |
| Accelerators | 0.8 | 0.8 | 0.8 | 0.8 |
| TEST |  |  |  |  |

Table 3-continued

|  | Composition 9 | Composition 10 | Composition 11 | Composition 12 |
|---|---|---|---|---|
| RESULTS |  |  |  |  |
| Mooney Viscosity | 28.0 | 27.2 | 28.5 | 27.3 |
| Demattia Crack (inches) | 0.53 | 0.48 | 0.38 | 0.33 |
| dc/dn cycles @ 60% Strain | 1.2E + 05 | 1.6E + 05 | 1.4E + 05 | 4.4E + 05 |
| Modulus @ 100% elongation, 72° F. (Mpa) | 2.0 | 2.0 | 2.2 | 2.1 |
| Modulus @ 300% elongation, 72° F. (Mpa) | 7.3 | 6.9 | 7.2 | 6.9 |
| Tensile at Break, 72° F. (Mpa) | 15.4 | 14.7 | 13.9 | 14.3 |
| Elongation at Break, 72° F. (Mpa) | 597 | 588 | 564 | 592 |

[3] Liquid functionalized polyisoprene known as LIR-403 from Kuraray Co., having the formula:

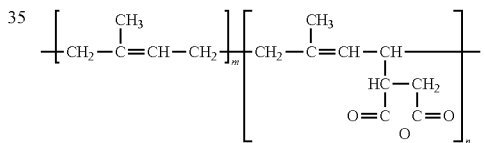

Examples 13-16

Four rubber compositions were prepared according to the formulations shown in Table 4. Table 4 also identifies the mixing step where each ingredient was added. The compositions were prepared by mixing the ingredients together in a Banbury mixer. All amounts shown are in phr, where the low molecular weight polymer is being treated as a processing aid rather than as part of the rubber component. Compositions 14 and 16 have a reduced oil amount in order to obtain approximately the same modulus as the control compositions (Compositions 13 and 15, respectively).

Table 4 also contains the properties of Compositions 13-16. It can bee seen that Compositions 14 and 16, which were prepared according to the method of the disclosure, have improved fatigue to failure versus Compositions 13 and 15 as evidenced by the Monsanto Flexometer results, while maintaining equal moduls. Without intending to be bound by theory, it is believed that the low molecular weight polymer containing functional groups has allowed the natural rubber, polybutadiene and SBR to retain a more equal filler concentration, thereby improving crack resistance resulting in an improved fatigue to failure result.

TABLE 4

|  | Composition 13 | Composition 14 | Composition 15 | Composition 16 |
|---|---|---|---|---|
| MasterBatch-1 | | | | |
| Low Molecular Weight Polymer[3] | 0 | 4 | 0 | 6 |
| Natural Rubber | 50 | 50 | 50 | 50 |
| Polybutadiene | 20 | 0 | 20 | 0 |
| Silica | 0 | 0 | 14.4 | 14.4 |
| Silane | 0 | 0 | 1.5 | 1.5 |
| Carbon Black | 34.4 | 34.4 | 20 | 20 |
| Oil | 9 | 5 | 9 | 3 |
| Other Ingredients | 14.5 | 14.5 | 14.5 | 14.5 |
| MasterBach-2 | | | | |
| Composition from MB-1 | 127.9 | 107.9 | 129.4 | 109.4 |
| Polybutadiene | 0 | 20 | 0 | 20 |
| Final Batch | | | | |
| Composition from MB-2 | 127.9 | 127.9 | 129.4 | 129.4 |
| SBR | 30 | 30 | 30 | 30 |
| Carbon Black | 15.6 | 15.6 | 15.6 | 15.6 |
| Oil | 3 | 3 | 3 | 3 |
| Sulfur | 1 | 1 | 1 | 1 |
| Accelerators | 4.4 | 4.4 | 4.4 | 4.4 |
| TEST RESULTS | | | | |
| Mooney Viscosity | 31.2 | 30.6 | 35.3 | 36.7 |
| Modulus @ 300% elongation, 72° F. (Mpa) | 13.1 | 13.9 | 11.2 | 10.9 |
| Monsanto Fatigue Cycles | 14011 | 27125 | 34319 | 40336 |

[3]Liquid isoprene-butadiene copolymer known as LIR-390 from Kuraray Co.

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

We claim:

1. A method comprising:
   a. mixing in a first mixing step ingredients comprising:
      i. a first polymer,
      ii. a low molecular weight polymer having a number average molecular weight of about 5,000 to about 100,000, and
      iii. a filler,
   b. mixing in a second mixing step ingredients comprising:
      i. the mixture obtained in step (a),
      ii. a second polymer that is different from said first polymer, and
      iii. optionally a filler.

2. The method of claim 1, wherein said first polymer is polyisoprene.

3. The method of claim 1, wherein said second polymer is selected from the group consisting of styrene-butadiene rubber, styrene-isoprene rubber, styrene-isoprene-butadiene rubber, isoprene-butadiene rubber, polybutadiene, acrylonitrile-butadiene rubber, silicone rubber, fluoroelastomers, ethylene acrylic rubber, nitrile rubber, hydrogenated nitrile rubber, ethylene propylene rubber, ethylene propylene diene monomer rubber, butyl rubber, polychloroprene, and mixtures thereof.

4. The method of claim 1, wherein said second polymer is polybutadiene.

5. The method of claim 1, wherein said filler comprises carbon black.

6. The method of claim 1, wherein said low molecular weight polymer comprises a block A and a block B, where said block A comprises isoprene mer units and said block B comprises butadiene mer units.

7. The method of claim 6, wherein said low molecular weight polymer has a number average molecular weight of about 20,000 to about 60,000.

8. The method of claim 1, wherein said low molecular weight polymer comprises one or more functional group.

9. The method of claim 8, wherein said functional group(s) is selected from the group consisting of hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups, and mixtures thereof.

10. The method of claim 9, wherein said low molecular weight polymer has a number average molecular weight of about 20,000 to about 60,000.

11. The method of claim 6, wherein said first polymer is polyisoprene, said second polymer is polybutadiene, and said filler comprises carbon black.

12. The method of claim 8, wherein said first polymer is polyisoprene, said second polymer is polybutadiene, and said filler comprises carbon black.

13. The method of claim 12, wherein said functional group(s) is selected from the group consisting of amine, hydroxyl, carbonyl, carboxyl, and mixtures thereof.

14. A tire having a component comprising a rubber composition made by the method of claim 1, where said component is selected from a tread, a sidewall, or mixtures thereof.

15. A method comprising:
   a. mixing in a first mixing step ingredients comprising:
      i. a first polymer comprising isoprene mer units,
      ii. a low molecular weight polymer comprising isoprene mer units, wherein said low molecular weight polymer has a number average molecular weight of about 5,000 to about 100,000, and
      iii. a filler, b. mixing in a second mixing step ingredients comprising:
   i. the mixture obtained in step (a),
   ii. a second polymer that is different from said first polymer, and
   iii. optionally a filler.

16. A method of forming a sidewall for a tire, comprising the steps of:
   a. mixing in a first mixing step ingredients comprising:
      i. a first polymer,
      ii. a low molecular weight polymer having a number average molecular weight of about 5,000 to about 100,000, and
      iii. a filler,
   b. mixing in a second mixing step ingredients comprising:
      i. the mixture obtained in step (a),
      ii. a second polymer that is different from said first polymer, and
      iii. optionally a filler,
   c. mixing in a third mixing step ingredients comprising:
      i. the mixture obtained in step (b),
      ii. a vulcanizing agent, and
      iii. one or more vulcanization accelerator,
   d. forming the mixture obtained in step (c) into a sidewall for a tire, and
   e. vulcanizing the mixture obtained in step (d).

17. The method of claim 16, wherein said first polymer is polyisoprene.

18. The method of claim 16, wherein said second polymer is polybutadiene.

19. The method of claim 16, wherein said low molecular weight polymer comprises a block A and a block B, where said block A comprises isoprene mer units and said block B comprises butadiene mer units.

20. The method of claim 16, wherein said low molecular weight polymer comprises one or more functional group.

21. The method of claim 20, wherein said functional group(s) is selected from the group consisting of hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups, and mixtures thereof.

* * * * *